Jan. 24, 1961 H. B. RANDOLPH 2,969,120
GARDEN TOOLS
Filed Jan. 9, 1959
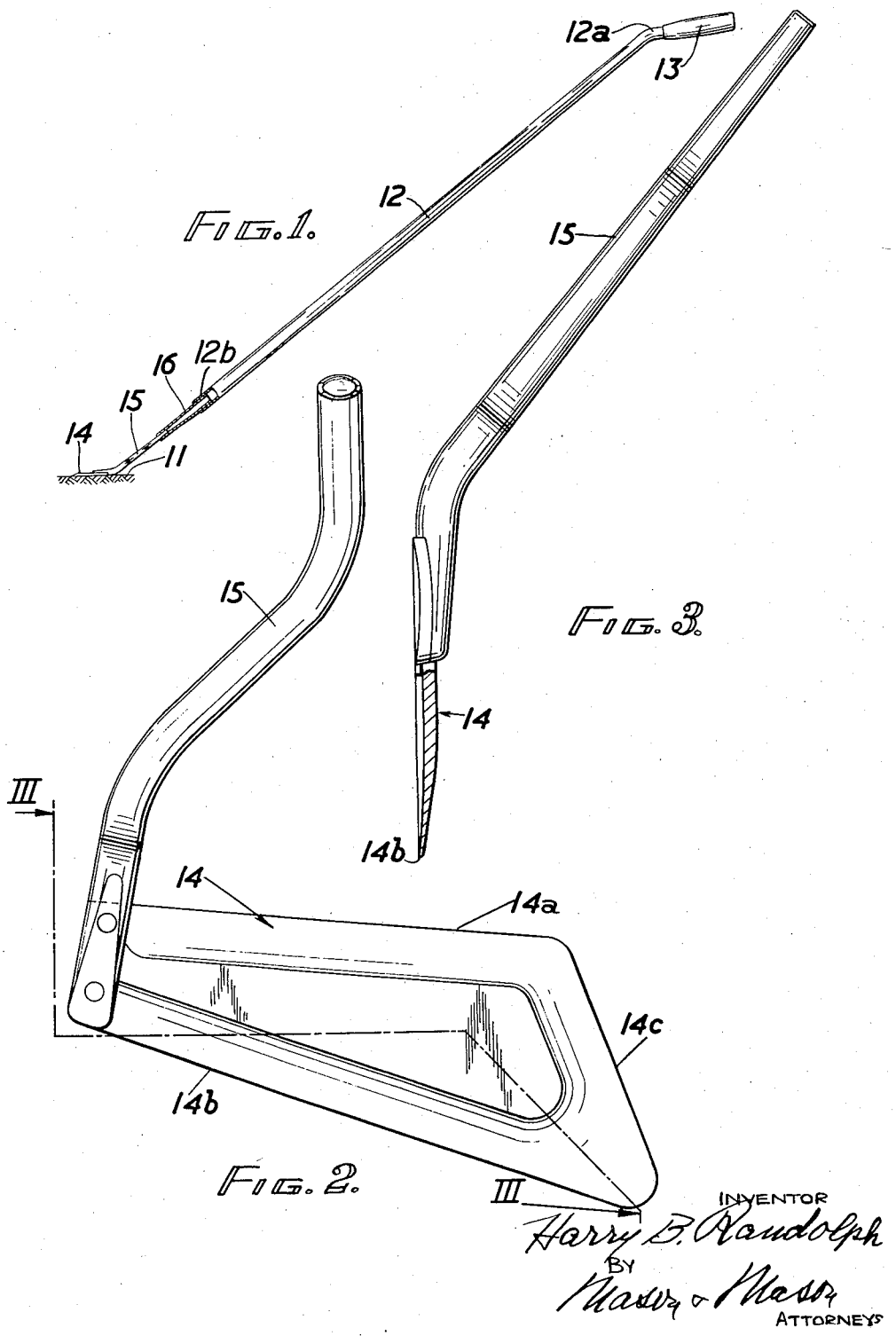
INVENTOR
Harry B. Randolph
BY
Mason & Mason
ATTORNEYS

United States Patent Office 2,969,120
Patented Jan. 24, 1961

2,969,120

GARDEN TOOLS

Harry Beckham Randolph, 16 Pall Mall,
London SW. 1, England

Filed Jan. 9, 1959, Ser. No. 785,942

5 Claims. (Cl. 172—371)

This invention relates to garden hoes.

It is an object of this invention to provide an improved garden hoe by which hoeing is made easier than heretofore.

It is a further object of this invention to provide a garden hoe which is much stronger, more robust and harder wearing than known garden hoes.

According to the present invention there is provided a garden hoe having a blade which is elongated in a direction transverse to the normal direction of to-and-fro movement of the blade when in use and which is held in a substantially horizontal position during such use, the blade having a front edge which is inclined at an angle to a line perpendicular to said normal direction and which has that end of the front edge which is secured to the handle of the hoe rearmost, one end of the blade which is remote from the handle being inclined inwardly towards the handle when considered from the front edge whereby the front edge and said end of the blade form a forwardly directed tapered portion.

A hoe having a blade with the aforesaid construction is much easier to use than hoes with blades of known shape.

In addition to the aforesaid form of construction the blade may be bevelled on one or more edges to form a cutting edge. Furthermore the undersurface of the blade may be made concave to facilitate the hoeing action.

The handle may be made of tubular metal to provide an all-metal hoe which is thereby strong, robust and hard wearing.

One construction of garden hoe in accordance with the invention will now be described, by way of example only. This construction is illustrated in the accompanying drawings in which:

Figure 1 is a part sectional side elevation of the hoe;

Figure 2 is a plan view of the blade and tang only, on a larger scale, and

Figure 3 is a side elevation of the blade and tang on the same scale as Figure 2 taken on the line III—III in Figure 2 to disclose its underside curvature.

Referring firstly to Figure 1, it will be seen that the hoe is provided with a tubular steel handle 12 the upper end 12a of which is inclined at a suitable angle to the major part of the handle and is provided with a rubber handgrip 13.

A hoe blade 14 is riveted to one end of a curved tang 15 whose other end is spot-welded to the narrow end of a tapered connecting tube 16. The larger bore end of the connecting tube 16 is brazed into the lower end 12b of the handle 12. The transverse curve in the tang 15 (seen in Figure 2) is such that the blade 14 is positioned centrally with respect to the longitudinal axis of the handle 12, that is the axis intersects the rear edge 14a of the blade 14 approximately midway along its length, and the portion of the tang 15 which is riveted to the blade is curved (as seen in Figure 3) in a different plane so that the major surfaces of the blade 14 are at a suitable inclination to the handle 12. In this embodiment the inclination is such that in normal use the major surfaces of the blade 14 will be substantially parallel to the ground whose surface is indicated at 11 in Figure 1, when the longitudinal axis of the handle is at an angle of approximately forty-five degrees to the ground.

The rear edge 14a of the blade 14 is substantially perpendicular to the normal direction of to-and-fro movement of the blade when the hoe is in use, the riveted end of the blade 14 being at an angle to the rear edge 14a which is a little greater than a right angle. The front edge 14b is inclined to the rear edge 14a, with that end of the front edge 14b adjacent the tang 15 rearmost. The width of the blade 14 increases progressively from the end of the blade which is riveted to the tang 15. The front edge 14b is considerably longer than the rear edge 14a so that the end 14c remote from the riveted end is inclined inwardly towards the centre of the blade when considered from the front edge 14b, so that the front edge 14b and the end 14c form a forwardly directed tapered portion. To provide what is effectively a cutting edge, the blade is bevelled on all sides except that which is riveted to the tang. If desired, some only of the edges of the blade 14 may be bevelled.

To facilitate cutting and to give the blade 14 increased rigidity the undersurface may be made concave as shown in Figure 3.

What I claim is:

1. A garden hoe comprising a handle, a blade, said blade being elongated and having a front edge, a rear edge and two ends, said ends being shorter than said front and rear edges, and means attaching one end of said blade to said handle, said attaching means having the end attached to said blade offset from an axial line from said handle, the longitudinal axis of said handle being inclined at an angle of approximately forty-five degrees to the plane in which lie said two blade sides and said two blade ends, said front edge being inclined to the rear edge with that end of the front edge rearmost which is adjacent that blade end attached to said handle, the other end of said blade being inclined to said rear edge at an angle which is appreciably greater than a right angle whereby said front edge and said other end of the blade constitute a forwardly directed tapered portion, said axial line intersecting said rear blade edge at right angles substantially midway of its length and intersecting said front edge at acute and obtuse angles on opposite sides of said line, that portion of the front edge lying on said attaching means side making an obtuse angle with the adjacent end and that portion of the front edge remote from said attaching means side making an acute angle with the adjacent end.

2. A garden hoe comprising a blade, said blade being elongated and having substantially straight front and rear edges and two substantially straight ends shorter than said two edges, one end being substantially at right angles to said rear edge and the other end being at an angle to said rear edge which is appreciably greater than a right angle, said other end being longer than said one end and the front edge being longer than said rear edge, a tubular metal handle, the longitudinal axis of said handle being inclined at an angle of approximately forty-five degrees to the plane in which lie said two blade sides and said two blade ends, a hand grip, said hand grip being secured to one end of said tubular metal handle, a metal tang, one end of said metal tang being secured to the end of said handle remote from said hand grip and the other end of said metal tang being secured to the first mentioned end of said blade, said tang having said one end offset from its opposite end, the relation between said handle and said blade edges being such that an axial line from said handle intersects said rear blade edge at right angles substantially midway of its length and intersects said front edge at acute and obtuse angles on opposite sides of said line, that portion of the front edge lying on the tang side making an obtuse angle with the adjacent end and that portion of the front edge remote from said tang side making an acute angle with the adjacent end.

3. A garden hoe comprising a steel blade, said blade being elongated and relatively thin, said blade having a first end and a second end, said second end being longer than said first end, said blade also having a rear edge, said rear edge being longer than said second end, said blade further having a front edge, said front edge being longer than said rear edge, said first end being inclined to said rear edge at an angle a little greater than a right angle and said second end being inclined to said rear edge at an angle greater than the angle at which said first end is inclined to said rear edge, a tubular metal handle, the longitudinal axis of said handle being inclined at an angle of approximately forty-five degrees to the plane in which lie said two blade sides and said two blade ends, said handle having an inclined hand grip portion at one end, a metal tang having two ends, one end of said metal tang being secured to said blade adjacent said first end, and a tapered metal connecting tube having a narrow bore end and a wide bore end, said narrow bore end being connected to the opposite end of said tang to that which is attached to said blade, said wide bore end being connected to the end of said handle remote from said hand grip portion, said tang having said one end offset from said opposite end, the relation between said handle and said blade edges being such that an axial line from said handle intersects said rear blade edge at right angles substantially midway of its length and intersects said front edge at acute and obtuse angles on opposite sides of said line, that portion of the front edge lying on the tang side making an obtuse angle with the adjacent end and that portion of the front edge remote from the tang side making an acute angle with the adjacent end.

4. A garden hoe according to claim 3, wherein said second blade end and said front and rear edges are bevelled.

5. A garden hoe according to claim 4, wherein the undersurface of said blade is concave.

References Cited in the file of this patent

UNITED STATES PATENTS

| | | |
|---|---|---|
| 355,182 | Lefavour | Dec. 28, 1886 |
| 669,163 | Grover | Mar. 5, 1901 |
| 678,535 | Bigg | July 16, 1901 |
| 1,127,015 | Keeler | Feb. 2, 1915 |
| 1,566,868 | Hinklemann | Dec. 22, 1925 |
| 1,687,986 | Miller | Oct. 16, 1928 |

FOREIGN PATENTS

| | | |
|---|---|---|
| 10,485 | Australia | Dec. 9, 1932 |
| 137,814 | Australia | June 30, 1950 |